(12) United States Patent
Ito (10) Patent No.: US 11,496,683 B2
(45) Date of Patent: Nov. 8, 2022

(54) IMAGE CAPTURING APPARATUS AND CONTROL METHOD THEREOF, AND IMAGE CAPTURING SYSTEM

(71) Applicant: CANON KABUSHIKI KAISHA, Tokyo (JP)

(72) Inventor: Shigeyoshi Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/186,929

(22) Filed: Feb. 26, 2021

(65) Prior Publication Data

US 2021/0281755 A1 Sep. 9, 2021

(30) Foreign Application Priority Data

Mar. 4, 2020 (JP) .............................. JP2020-037156

(51) Int. Cl.
*H04N 5/232* (2006.01)
*H04N 5/235* (2006.01)

(52) U.S. Cl.
CPC ......... *H04N 5/23245* (2013.01); *H04N 5/235* (2013.01); *H04N 5/23293* (2013.01)

(58) Field of Classification Search
CPC ....... H04N 5/3765; H04N 2201/04767; H04N 2201/04768
See application file for complete search history.

(56) References Cited

U.S. PATENT DOCUMENTS

| | | | |
|---|---|---|---|
| 7,710,468 B2 | 5/2010 | Uchida | |
| 2007/0216792 A1* | 9/2007 | Futamura | H04N 5/335 348/314 |
| 2008/0079817 A1* | 4/2008 | Murata | H04N 5/23245 348/222.1 |
| 2012/0307119 A1* | 12/2012 | Nakaseko | H04N 5/3765 348/302 |
| 2015/0138328 A1* | 5/2015 | Yokohama | A61B 1/045 348/65 |
| 2019/0199944 A1* | 6/2019 | Wojcik | H04N 5/343 |

FOREIGN PATENT DOCUMENTS

JP 2007243615 A 9/2007

* cited by examiner

*Primary Examiner* — Twyler L Haskins
*Assistant Examiner* — Dwight Alex C Tejano
(74) *Attorney, Agent, or Firm* — Rossi, Kimms & McDowell LLP (57) ABSTRACT

An image capturing apparatus comprises a first generation circuit that generates a first synchronization signal with a predetermined cycle, a second generation circuit that generates a second synchronization signal for controlling timings for driving an image sensor including timings for repeatedly reading out image signals from the image sensor, a control circuit that controls the second generation circuit in accordance with a driving method of the image sensor, a selector that selects the first synchronization signal or the second synchronization signal in accordance with the driving method of the image sensor and outputs the selected synchronization signal, and a display panel that updates and displays image signals which are repeatedly read out from the image sensor at timings based on the synchronization signal selected by the selector.

8 Claims, 8 Drawing Sheets

IMAGE CAPTURING APPARATUS AND CONTROL METHOD THEREOF, AND IMAGE CAPTURING SYSTEM

BACKGROUND OF THE INVENTION

Field of the Invention

The present invention relates to an image capturing apparatus and control method thereof, and an image capturing system and, more specifically, to control of shooting timings of images and display timings of shot images.

Description of the Related Art

Some digital cameras and electronic devices having a camera function (hereinafter collectively referred to as "image capturing apparatus") have a live view (LV) function. The LV function is a function of shooting a moving image and displaying the obtained image (hereinafter, referred to as "LV image") on a display in parallel. By using the displayed LV image as a finder, a user can find a desired composition for still image shooting or moving image shooting while checking the LV image. Hereinafter, the operation of adjusting a shooting composition is referred to as "framing".

Operability for framing is important for a user to shoot an image as the user intends. For example, if the time lag (display time lag) from the shooting of an LV image to the displaying of the LV image on the display is long, a phenomenon in which a subject has already moved to somewhere at the timing when the image of the subject is displayed on the display may occur. Thus, the display time lag greatly affects the operability for framing.

In an image capturing apparatus that captures a still image by performing framing using the LV function, when performing continuous shooting of still images, the framing cannot be performed unless the LV image is continuously displayed on the display even during the continuous shooting of still images. However, in a case where shooting and displaying of the LV image are performed between frames of still images during continuous shooting of still images, it is difficult to adjust the timing of capturing each frame of the LV image if the interval of the continuous shooting of still images is short. As a result, during the continuous shooting of still images, a period from the timing of capturing each frame of the LV image to the timing of updating the LV image on the display becomes long, a display time lag increases, and the framing becomes difficult.

To solve this problem, Japanese Patent Laid-Open No. 2007-243615 discloses a method for reducing a display time lag by synchronously controlling the image shooting timing of the image sensor and the display start timing of the display with a predetermined time difference.

In the prior art disclosed in Japanese Patent Laid-Open No. 2007-243615 described above, a method of adjusting the image shooting timing based on the image reproduction timing is disclosed in order to reduce the display time lag. However, such a method is not always the optimum control method. For example, in still image shooting, the release time lag is important when controlling the shooting timing and the playback timing, and in moving image shooting, it is necessary to control the shooting timing and the playback timing in consideration of audio recording, time recording, and the like.

SUMMARY OF THE INVENTION

The present invention has been made in consideration of the above situation, and displays a live view image at a timing suitable for each of a plurality of driving methods of the image sensor.

According to the present invention, provided is an image capturing apparatus comprising: a first generation circuit that generates a first synchronization signal with a predetermined cycle; a second generation circuit that generates a second synchronization signal for controlling timings for driving an image sensor including timings for repeatedly reading out image signals from the image sensor; a control circuit that controls the second generation circuit in accordance with a driving method of the image sensor; a selector that selects the first synchronization signal or the second synchronization signal in accordance with the driving method of the image sensor and outputs the selected synchronization signal; and a display panel that updates and displays image signals which are repeatedly read out from the image sensor at timings based on the synchronization signal selected by the selector.

Further, according to the present invention, provided is an image capturing system comprising: an image capturing apparatus comprising: a first generation circuit that generates a first synchronization signal with a predetermined cycle; a second generation circuit that generates a second synchronization signal for controlling timings for driving an image sensor including timings for repeatedly reading out image signals from the image sensor; a control circuit that controls the second generation circuit in accordance with a driving method of the image sensor; a selector that selects the first synchronization signal or the second synchronization signal in accordance with the driving method of the image sensor and outputs the selected synchronization signal; and a display panel that updates and displays image signals which are repeatedly read out from the image sensor at timings based on the synchronization signal selected by the selector; and a processing apparatus, connected to the image capturing apparatus, that includes a processing circuit that processes an image signal output from the image sensor without taking synchronization with the image capturing apparatus.

Furthermore, according to the present invention, provided is a control method of an image capturing apparatus, the method comprising: generating a first synchronization signal with a predetermined cycle; generating a second synchronization signal for controlling timings for driving an image sensor including timings for repeatedly reading out image signals from the image sensor; controlling generation of the second synchronization signal in accordance with a driving method of the image sensor; selecting the first synchronization signal or the second synchronization signal in accordance with the driving method of the image sensor and outputting the selected synchronization signal; and updating and displaying image signals which are repeatedly read out from the image sensor on a display panel at timings based on the selected synchronization signal.

Further, according to the present invention, provided is a non-transitory computer-readable storage medium, the storage medium storing a program that is executable by a computer, wherein the program includes a program code for causing the computer to perform a control method of an image capturing apparatus, the method comprising: generating a first synchronization signal with a predetermined cycle; generating a second synchronization signal for controlling timings for driving an image sensor including timings for repeatedly reading out image signals from the image sensor; controlling generation of the second synchronization signal in accordance with a driving method of the image sensor; selecting the first synchronization signal or the second synchronization signal in accordance with the driving method of the image sensor and outputting the selected synchronization signal; and updating and displaying image signals which are repeatedly read out from the image sensor on a display panel at timings based on the selected synchronization signal.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

Figure 1:
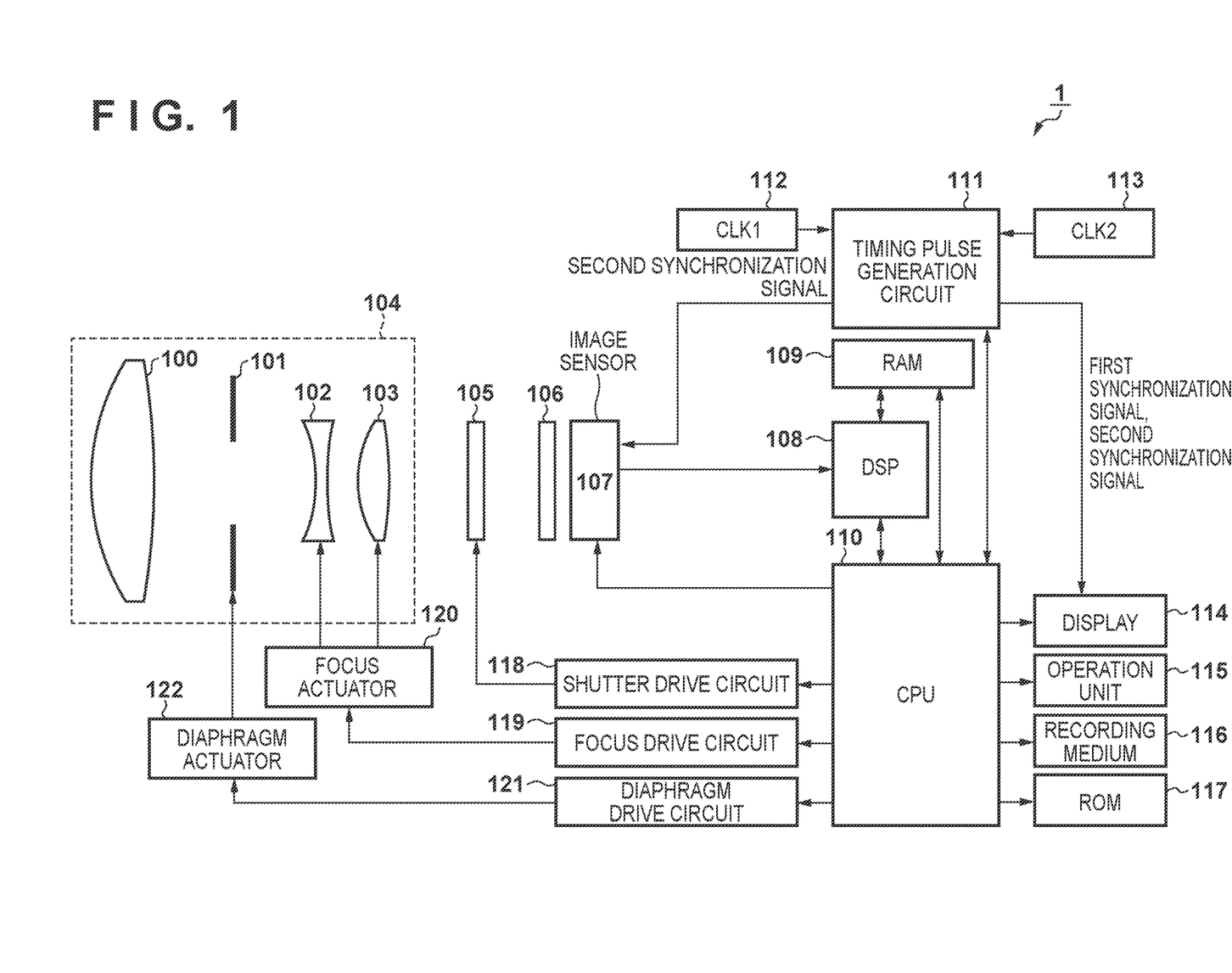
FIG. 1 is a block diagram showing a configuration of an image capturing apparatus according to a first embodiment of the present invention.

FIG. 1 is a block diagram showing the configuration of an image capturing apparatus 1 according to a first embodiment of the present invention. In FIG. 1, a first lens 100 is arranged at the tip of an imaging optical system 104. Aperture diameter of a diaphragm 101, driven by a diaphragm actuator 122, is adjusted to control the light amount at the time of shooting. A second lens 102 and a third lens 103 are driven by a focus actuator 120 and move back and forth in the optical axis direction to adjust the focal point of the imaging optical system 104.

A focal plane shutter 105 has a function of adjusting the exposure period at the time of shooting a still image. However, in a case where the electronic shutter is used in an image sensor 107 for adjusting the exposure period in the slit-rolling reading, the focal plane shutter 105 is not used for adjusting the exposure period. An optical low-pass filter 106 is used to reduce false color and moiré in a captured image.

The image sensor 107 photoelectrically converts an optical image of a subject formed by the imaging optical system 104 into an electric signal (image signal). Further, the image sensor 107 has an electronic shutter function and can acquire an image signal by the slit-rolling reading.

A digital signal processor (DSP) 108 receives the image signal from the image sensor 107 and performs image processing on it. In addition to the image processing, the DSP 108 calculates information to be used for driving focus lenses (second lens 102, third lens 103) based on information from the image sensor 107.

A random access memory (RAM) 109 has both a function of storing image data processed by the DSP 108 and a function as a work memory when a central processing unit (CPU) 110 operates. Although the present embodiment is configured to realize these functions using the RAM 109, other types of memory may be used as long as the access speed of the memory is sufficiently high and does not cause any problem in operation. Further, in the present embodiment, the RAM 109 is arranged outside the DSP 108 and the CPU 110, but a part or all of the functions thereof may be built in the DSP 108 and/or the CPU 110.

The CPU 110 executes a program for controlling each part of the image capturing apparatus 1, and controls the overall operation of the image capturing apparatus 1. The CPU 110 can control reading of image signals from the image sensor 107 by performing various settings on the image sensor 107. Further, the CPU 110 communicates with a timing pulse generation circuit 111 and controls the generation timing of various timing pulses for controlling the operation of each module as will be described later.

The timing pulse generation circuit 111 generates a first synchronization signal and a second synchronization signal based on a clock signal CLK1 from a first clock 112 and a clock signal CLK2 from a second clock 113. The generated first synchronization signal and second synchronization signal will be described later in detail.

Further, a display 114 receives both the first synchronization signal and the second synchronization signal and updates a displayed image in synchronization with a synchronization signal selected by a synchronization signal selector 401 which will be described later. Further, the CPU 110 also has a function of controlling the focus actuator 120 to adjust the focal point of the imaging optical system 104 using the calculation result output from the DSP 108.

The display 114 displays a still image and a moving image which are processed by the DSP 108, a menu, and so on. By sequentially displaying frames of a moving image (LV image) on the display 114 and using the display 114 as a finder, the user can perform framing while confirming the composition in still image shooting and moving image shooting. The display 114 may include a plurality of display devices such as a rear display and an electronic viewfinder (EVF).

An operation unit 115 is configured with operation members such as buttons and levers, and includes a mode switching dial, a still image shooting button for instructing shooting of a still image. Note that the operation unit 115 may not be provided with an operation member, and may be configured such that various instructions are input through a touch panel. By operating the mode switching dial, the user can arbitrarily set a still image mode and a moving image mode. Further, the user can shoot images by controlling the CPU 110 through the operation unit 115.

When the CPU 110 detects that the user has pressed the still image shooting button, the CPU 110 controls to shoot a still image after a certain period of time including a still image shooting preparation period has elapsed. Further, when the still image shooting button is continuously pressed after the shooting of a still image is started, continuous shooting of still images is performed. It should be noted that detailed operations relating to still image shooting will be described later with reference to the timing chart of FIG. 6.

A recording medium 116 is configured to be removable, and still image data and moving image data are recorded on it. A read only memory (ROM) 117 stores a program for the CPU 110 to control the operation of each unit.

A shutter drive circuit 118 drives and controls the focal plane shutter 105. A focus drive circuit 119 controls the focus actuator 120 based on the output of the CPU 110 to drive the focus lenses (second lens 102, third lens 103) forward and backward in the optical axis direction to perform focus adjustment of changing a focal point. A diaphragm drive circuit 121 controls the diaphragm actuator 122 to control the aperture of the diaphragm 101.

Next, the configuration of the image sensor 107 of this embodiment will be described with reference to FIGS. 2A and 2B.

Figure 2A:
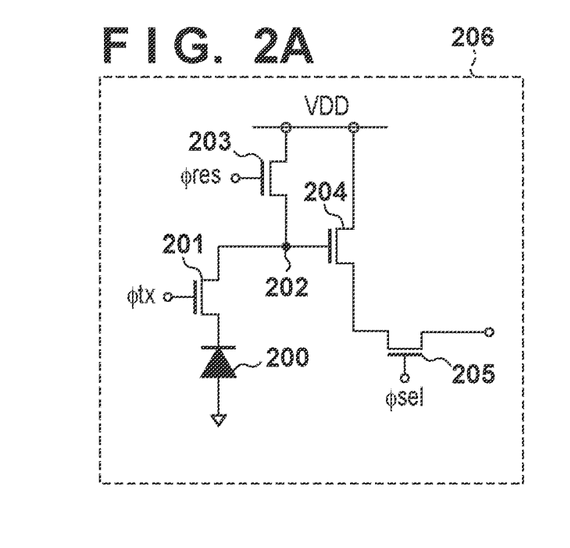
FIG. 2A is a circuit diagram of a pixel according to an embodiment.
Figure 2B:
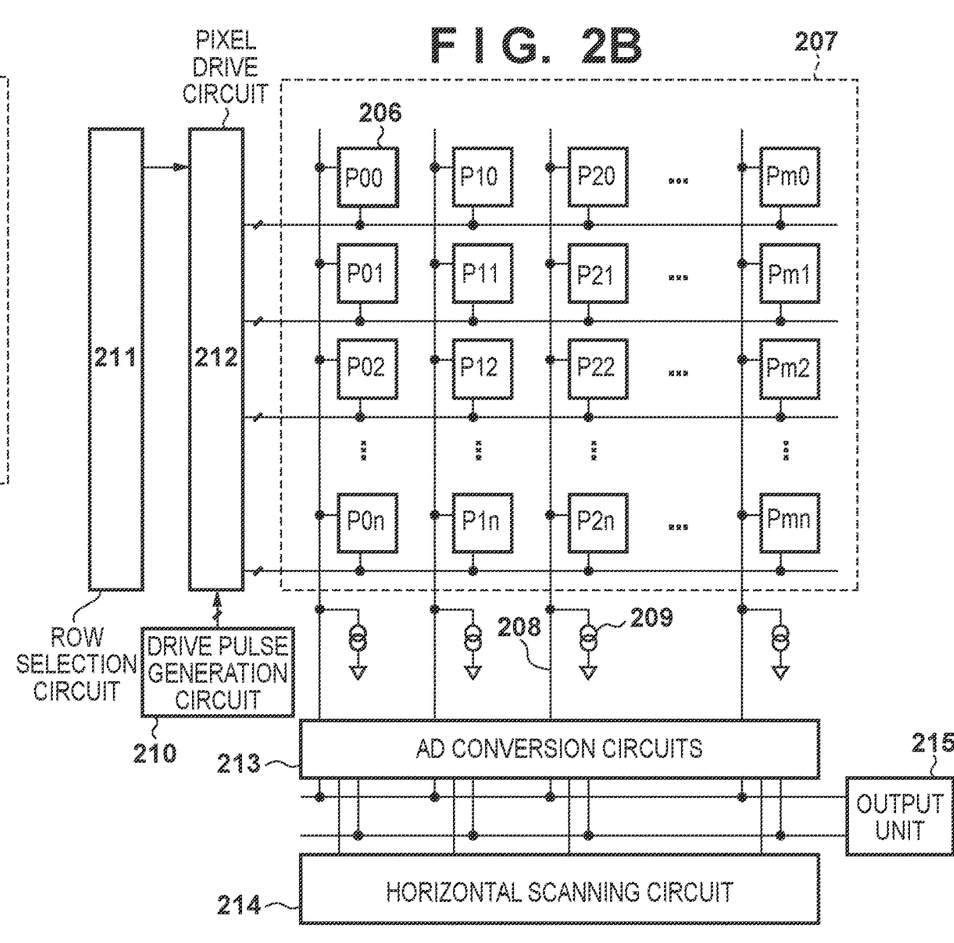
FIG. 2B is a block diagram of an image sensor according to the embodiment.

FIG. 2A is a diagram illustrating a detailed circuit configuration of a pixel 206 of the image sensor 107. A photodiode (PD) 200 photoelectrically converts incident light and accumulates the generated electric charge. A transfer switch 201 transfers the electric charge accumulated in the PD 200 to a floating diffusion portion (FD) 202 while a control signal ϕtx is set to High (hereinafter referred to as "H").

A reset switch 203 is a switch for resetting the FD 202, and is controlled by a signal ϕres. A pixel reset operation is realized by setting the signal ϕtx and the signal ϕres to H at the same time to set the PD 200 and the FD 202 to a power supply voltage (VDD). A pixel amplifier transistor 204 is connected to a constant current source 209 via a selection switch 205 and a vertical output line 208 described later. When a control signal ϕsel to the selection switch 205 becomes H, the pixel amplifier transistor 204 is connected to the vertical output line 208. Then, the charge transferred from the PD 200 to the FD 202 is converted into a voltage value corresponding to the amount of the charge and output to the vertical output line 208 as an image signal.

Next, the configuration of the image sensor 107 will be described with reference to FIG. 2B.

In a pixel array 207, a plurality of the pixels 206, (m+1) pixels in the horizontal direction and (n+1) pixels in the vertical direction, are arranged in a matrix. Note that both m and n are natural numbers. A drive pulse generation circuit 210 generates pulse signals to be used for a reset operation and a readout operation of the pixels 206 based on the synchronization signals from the timing pulse generation circuit 111.

The generated pulse signals are supplied to a pixel drive circuit 212. A row selection circuit 211 selects a row to which the pulse signals generated by the drive pulse generation circuit 210 are to be supplied, and sets the selected row in the pixel drive circuit 212. The pixel drive circuit 212 supplies the pulse signals generated by the drive pulse generation circuit 210 to the row set by the row selection circuit 211 as the control signals described above.

Image signals are output to the vertical output lines 208 from the pixels 206 in the selected row in accordance with the control signals supplied from the pixel drive circuit 212. The constant current source 209 forms a source follower circuit in combination with the pixel amplifier transistor 204.

AD conversion circuits (ADC) 213 convert the analog image signals output to the vertical output lines 208 into digital values corresponding to the signal levels of the analog image signals. The image signals converted into digital values by the ADCs 213 are sequentially selected by a horizontal scanning circuit 214 and transferred to an output unit 215.

By changing the driving of the pixel array 207 by the row selection circuit 211, the image signals can be read out in a plurality of different ways. For example, in the present embodiment, as a readout method for generating a still image, after the image signals are read out from the pixels in the uppermost row, the image signals are read out from the pixels in the next row, and reading out of the image signals from the pixels in the next row is repeated until the image signals are read out from the pixels in the lowermost row.

In addition, as a readout method for generating a moving image, for example, after the image signals are read out from the pixels in the uppermost row, reading out of the image signals from the pixels in every plural rows (for example, two rows) is repeated until the image signals are read out from the pixels in the lowermost row. By reading out the image signals in this way in generating a moving image, although the vertical resolution of the image deteriorates, the image signals of one frame can be read out in a short time and with low power consumption. Other than the above, the image signals can be read out using various readout methods.

Note that, in the present embodiment, an example in which the pixel drive circuit 212 and the ADCs 213 are built in the image sensor 107 has been described, but these circuits may be provided in a chip different from the image sensor 107.

Figure 3:
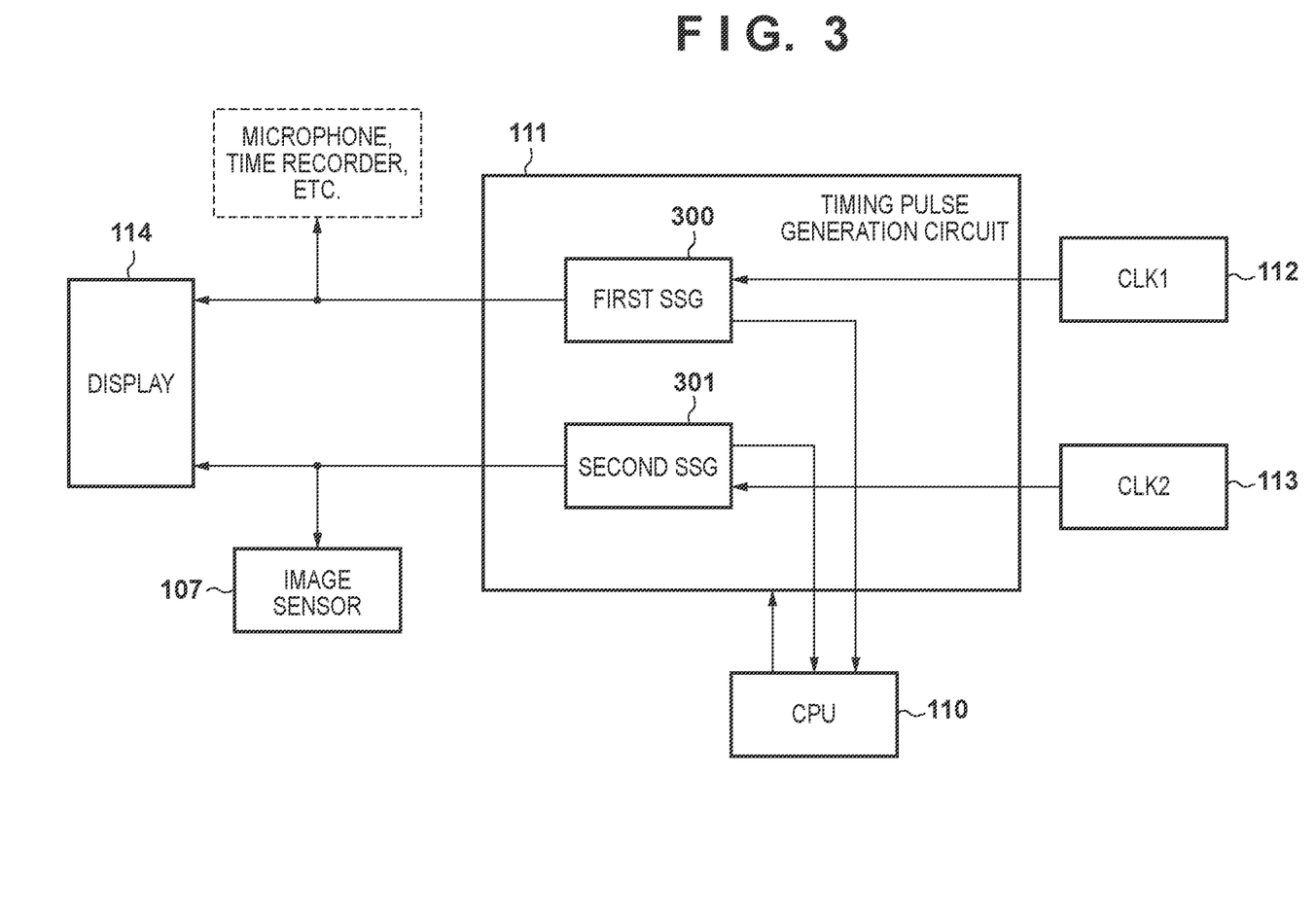
FIG. 3 is a block diagram of a timing pulse generation circuit according to the embodiment.

Next, the internal configuration of the timing pulse generation circuit 111 will be described with reference to FIG. 3. In the present embodiment, the timing pulse generation circuit 111 includes a first synchronization signal generation circuit 300 (hereinafter referred to as "first SSG") and a second synchronization signal generation circuit 301 (hereinafter referred to as "second SSG").

The first SSG 300 and the second SSG 301 are connected to the CPU 110 and can record the time of assertion timing of each synchronization signal. Specifically, when the CPU 110 detects that a synchronization signal is asserted from the first SSG 300 or the second SSG 301, it reads a value from a counter representing the system time of the CPU 110 and records the count value. This count value is used as the time of the assertion timing of each synchronization signal. Then, using the times, the time difference between the assertion timings of the first SSG 300 and the second SSG 301 can be calculated. In addition, by controlling the first SSG 300 or the second SSG 301 from the CPU 110, it is possible to generate synchronization signals of various cycles and change the generation timings of the synchronization signals.

Further, in this configuration, the first SSG 300 operates based on the clock signal CLK1 from the first clock 112, and generates and outputs the first synchronization signal. The second SSG 301 operates based on the clock signal CLK2 from the second clock 113, and generates and outputs the second synchronization signal. In this embodiment, the first SSG 300 is connected to the display 114 and components other than the image sensor 107 that require timing control, such as a microphone and time recorder. The second SSG 301 is connected to the image sensor 107 and the display 114.

In this embodiment, a configuration in which a plurality of clocks are input to the timing pulse generation circuit 111 to generate two types of synchronization signals is described, however the present invention is not limited to this. All SSGs may operate on the basis of a single clock signal or may operate on the basis of different clock signals. In addition, all or part of the above SSGs may independently form a block.

Figure 4:
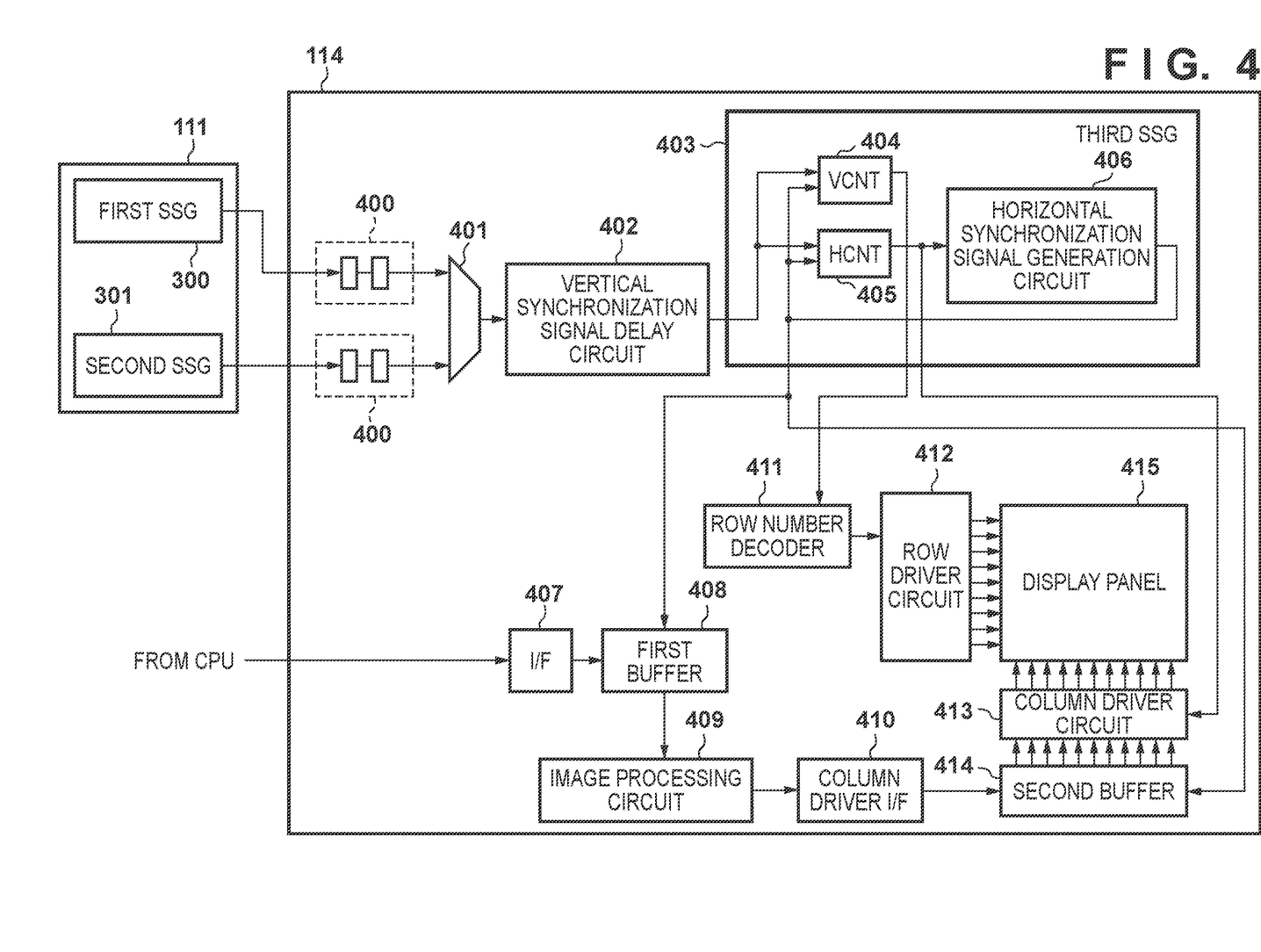
FIG. 4 is a block diagram showing a configuration of a display according to the embodiment.

FIG. 4 is a block diagram showing the configuration of the display 114 in the present embodiment.

Two external signal reception circuits 400 are circuits that receive the first synchronization signal and the second synchronization signal generated by the timing pulse generation circuit 111, respectively, and synchronize the received signals with the clock signal (not shown) input to the display 114. The external signal reception circuits 400 enables an external signal to be handled in the clock domain of display 114. The synchronization signal selector 401 selects the first synchronization signal or the second synchronization signal according to the flowchart of FIG. 5 described later, and inputs the selected synchronization signal to a vertical synchronization signal delay circuit 402. The vertical synchronization signal delay circuit 402 delays the input synchronization signal by a predetermined time and outputs it as an internal vertical synchronization signal. The vertical synchronization signal delay circuit 402 enables a third synchronization signal generation circuit 403 (hereinafter referred to as "third SSG") to operate in synchronization with the internal vertical synchronization signal delayed by a predetermined time from the synchronization signal selected by the synchronization signal selector 401. Hereinafter, the internal vertical synchronization signal will be referred to as a "third synchronization signal".

The third SSG 403 synchronizes with the third synchronization signal to generate a synchronization signal used for display control. A vertical counter 404 (VCNT) and a horizontal counter 405 (HCNT) reset the counter values when the third synchronization signal is asserted. The horizontal counter 405 counts up for each clock input to the display 114, and outputs the count value to a horizontal synchronization signal generation circuit 406 and outside of the third SSG 403. The horizontal synchronization signal generation circuit 406 asserts the horizontal synchronization signal for a predetermined period when the horizontal counter reaches a predetermined count value. The horizontal synchronization signal is output to the vertical counter 404, the horizontal counter 405, and outside of the third SSG 403.

The horizontal counter 405 resets the counter value when the horizontal synchronization signal is asserted. By controlling the horizontal counter 405 and the horizontal synchronization signal generation circuit 406 in this way, the horizontal synchronization signal is asserted at a predetermined cycle. The vertical counter 404 counts up the counter value by one when the horizontal synchronization signal is asserted. By controlling the vertical counter 404 in this way, the vertical counter 404 counts up by one at the end of one horizontal period. By inputting this counter value into a row number decoder 411, the scanning row of a display panel 415 can be specified. Since the vertical counter 404 and horizontal counter 405 are reset as the third synchronization signal is input, the third SSG 403 can be operated in synchronization with the third synchronization signal by adopting the above circuit configuration.

An interface (I/F) 407 is connected to the CPU 110 (or a DMAC (Direct Memory Access Controller) controlled by the CPU 110), receives an LV image read out from the image sensor 107, and transfers it to a first buffer 408. When the horizontal synchronization signal is asserted, a fixed amount of the image data of the LV image stored in the first buffer 408 is transferred to an image processing circuit 409. The amount of data transferred at this time should be the same as the amount of data updated in the display panel 415 in one horizontal period.

The image processing circuit 409 processes the image data of the LV image transferred from the first buffer 408 to become a signal suitable for display, and transfers it to a column driver interface (I/F) 410. The column driver I/F 410 transmits data to a second buffer 414. A column driver circuit 413 operates in synchronization with the counter value of the horizontal counter 405, and updates the display of one or more rows of the display panel 415 at a predetermined timing during one horizontal period.

The row number decoder 411 receives the counter value of the vertical counter 404 and converts the received counter value into a row number. The row number specified by row number decoder 411 is input to a row driver circuit 412 to select one or more rows of pixels of the display panel 415. The row driver circuit 412 updates the display of the row or rows selected here, and thereafter, each time the horizontal synchronization signal is asserted, the display is sequentially updated in units of rows to perform an update scan of the display panel 415.

The display 114 and the timing pulse generation circuit 111 do not necessarily have to have the configuration disclosed in the present embodiment. Any configuration can be used as long as there are three or more synchronization signal generation circuits, and the synchronization timing of the circuit that controls the operation timing of display 114 can be selected from any of synchronization signals generated by the three or more synchronization signal generation circuits described above.

Next, the display control of the display 114 according to the shooting mode will be described with reference to the flowchart of FIG. 5. The processing of this flowchart is realized by, for example, a program implemented in the CPU 110.

When shooting is started in step S100, the control is started. Here, the start of shooting may be, for example, immediately after the power is turned on, or when switching between the still image mode and the moving image mode is performed, but not limited thereto. Subsequently, in step S101, the state of a mode switching dial included in the operation unit 115 is detected, and in step S102, it is determined whether the still image mode is set or the moving image mode is set.

If the still image mode is set (Yes in step S102), the process proceeds to step S103, and the CPU 110 sets the display 114 so that the synchronization signal selector 401 built in the display 114 selects the second synchronization signal. Then, an LV image is read out in step S104, and the display 114 updates the display panel 415 in synchronization with the second synchronization signal in subsequent step S105. As a method of updating the display panel 415, for example, there is a method described with reference to FIG. 4. In step S106, it is determined whether or not the shooting is continued. For example, when the shooting is interrupted and the menu screen is displayed, or when the power switch is turned off, it is determined that the shooting is not continued, and the process proceeds to step S110 to end the shooting. On the other hand, when the shooting is continued, the process returns to step S102 and the shooting mode is determined again.

On the other hand, when it is determined in step S102 that the moving image mode is set (No in S102), the process proceeds to step S107, and the CPU 110 sets the display 114 so that the synchronization signal selector 401 built in the display 114 selects the first synchronization signal. After that, a moving image is read out in step S108, and in following step S109, the display 114 updates the display panel 415 in synchronization with the first synchronization signal.

Figure 5:
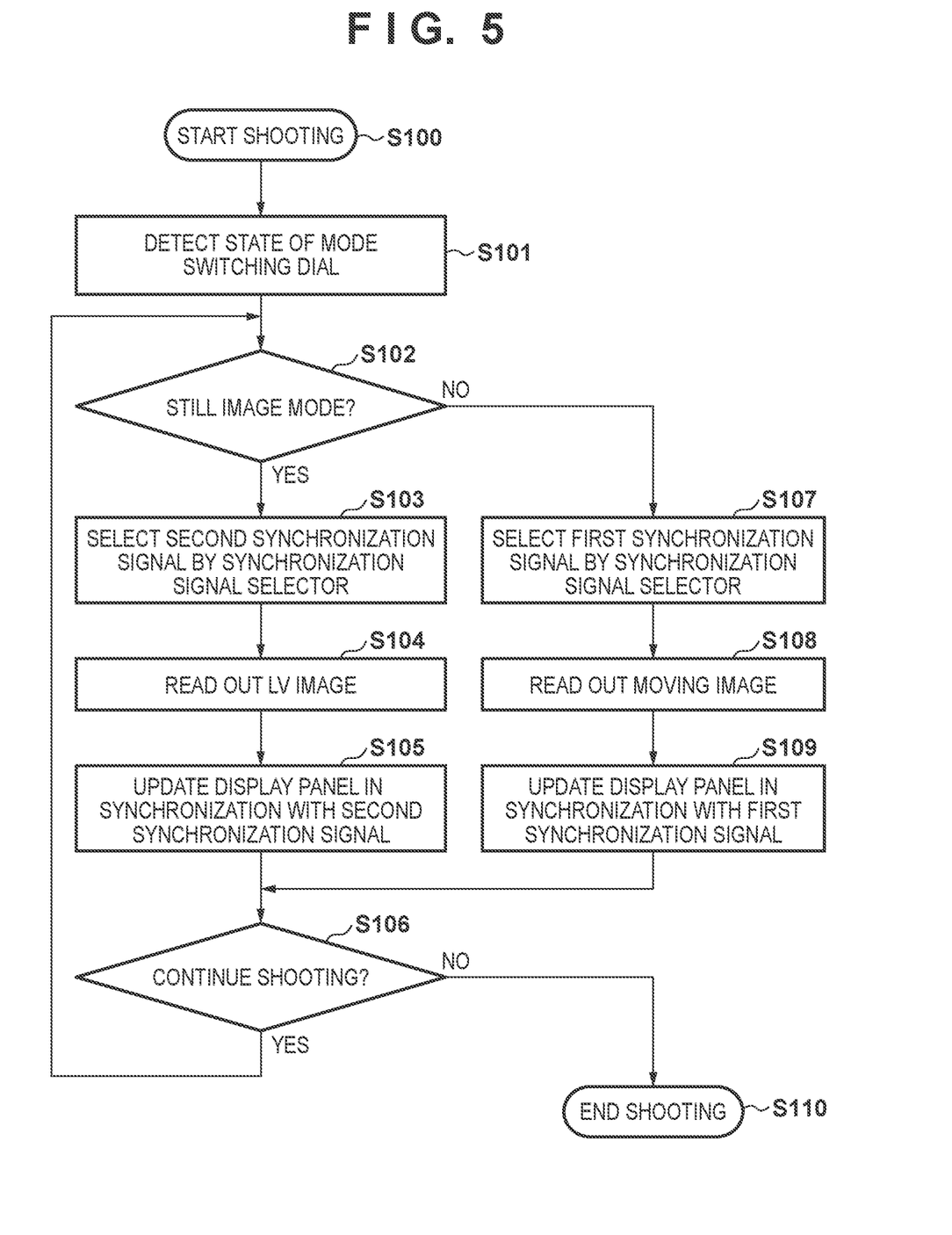
FIG. 5 is a flowchart for explaining display control of the display corresponding to a shooting mode according to the first embodiment.

As described above, according to the method described using the flowchart of FIG. 5, when shooting, it is possible to select the synchronization signal for synchronizing the display update of display 114 by switching between the synchronization signals by the synchronization signal selector 401 according to the shooting mode.

Figure 6:
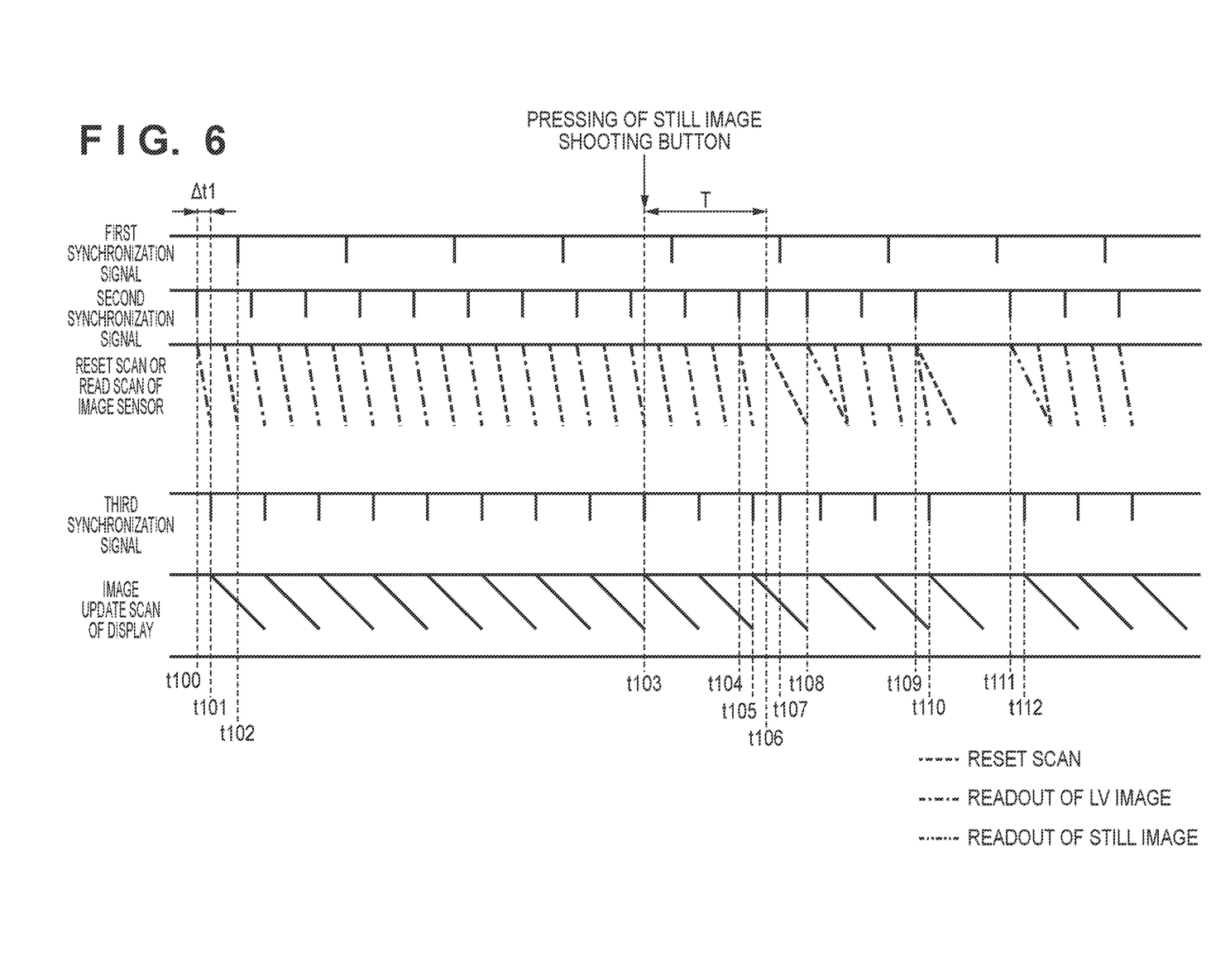
FIG. 6 is a timing chart showing an operation in still image mode according to the first embodiment.

Next, an operation of the image capturing apparatus 1 in a case where the still image mode is selected as the shooting mode by the mode switching dial will be described with reference to the timing chart of FIG. 6. In the present embodiment, a still image to be recorded and an LV image to be used for LV display are read out by different reading methods. In FIG. 6, in "reset scan or read scan of image sensor", dot-dash lines represent image signal readout for LV image generation, and the two-dot-dash lines represent image signal readout for still image generation. Each broken line represents reset scan corresponding to each reading, and the vertical direction corresponds to the rows of the image sensor 107 in the scanning direction. Further, in FIG. 6, in "image update scan of display", a diagonal solid line represents a scan in which the display panel 415 updates the LV display, and a vertical direction corresponds to rows of the display 114 in the scanning direction.

Further, as described above, this timing chart shows the operation when the shooting mode of the mode switching dial is set to the still image mode. Therefore, the synchronization signal selector 401 selects the second synchronization signal from the second SSG 301 and inputs it to the third SSG 403.

When the second synchronization signal is asserted at time t100, the image sensor 107 starts the read scan of the image signal for LV image generation in synchronization with the second synchronization signal. Time t101 is time at which a predetermined time lag Δt1 has elapsed from time t100 due to delay process by the vertical synchronization signal delay circuit 402. At this timing, the third SSG 403 resets the counter value and asserts a synchronization signal. The display panel 415 starts image update scan in synchronization with the synchronization signal from the third SSG 403.

The time lag Δt1 is set so as to be a time difference suitable for displaying the image signal for LV image generation read from the image sensor 107 on the display panel 415. For example, the time lag Δt1 may be set to the shortest time required since the image signal for LV image generation is read from the image sensor 107 and undergoes image processing by the DSP 108, until an LV image is displayed on the display 114 via the CPU 110. If the time lag Δt1 is shorter than this time required for the above processing, since an LV image based on the image signal read at time t100 is not ready for being displayed on the display 114, it results in displaying an LV image which is read one frame before. Further, when the time lag Δt1 is longer than the time required for the above processing, the display delay increases.

At time t102, the first synchronization signal is asserted from the first SSG 300, but in the still image mode, neither the second SSG 301 nor the third SSG 403 is synchronized with the first synchronization signal. Therefore, the first synchronization signal is a pulse that has nothing to do with the shooting operation or the display operation in this timing chart.

When the still image shooting button is pressed at time t103 and the start of shooting is instructed while readout of the image signal for LV image generation and displaying of the LV image are performed repeatedly, the operation of the timer that manages the release time lag starts. At the same time, preparations for shooting a still image such as focus adjustment and exposure control are performed. Then, by asserting the second synchronization signal at the time t106 when the release time lag T, which is longer than the time required for the shooting preparation, has elapsed, the reset scan for the still image is performed, and the charge accumulation for the still image is started.

Here, the second synchronization signal is asserted at time t104 at the timing immediately before time t106, and the third synchronization signal synchronized with the assertion of the second synchronization signal at the time t104 is asserted at time t105. Since the timing at which the still image shooting button is pressed has nothing to do with the cycle for shooting the LV image, there may be a case where an interval between time t104 when the second synchronization signal is asserted for reading out the LV image and time t106 when the second synchronization signal is asserted for starting accumulation of a still image is short as shown in this timing chart. In such a case, the third SSG 403 does not assert a synchronization signal (the third synchronization signal that was supposed to be asserted at time t107) corresponding to the synchronization signal asserted at a timing after time t104 (here, the second synchronization signal asserted at time t106). More specifically, in a case where the synchronization signal selected by the synchronization signal selector 401 is asserted at a time interval shorter than the predetermined display update cycle of the display panel 415, the input synchronization signal is masked in the third SSG 403 so that the counter value of the third SSG 403 is not reset and the synchronization signal is not asserted. By controlling the synchronization signals in this way, the display can be continued without hindering the update of the image that has begun to be displayed.

Then, when a predetermined charge accumulation period elapses from time t106, the second synchronization signal is asserted again at time S108, and the read scan of the image signal for still image generation is started. At this time as well, the phase of the second synchronization signal changes.

After that, if the still image shooting button is held down, continuous shooting of still images is performed. At time t109, the image signal for LV image generation is read out, and at the same time, charge accumulation (reset scan) for the still image is started. Then, at time t110, the display of the LV image whose reading is started at time t109 is started.

Reading of the still image is started at following time t111. The period from time t110 to time t111 is the charge accumulation period of the still image. As described above, when the charge accumulation period of the still image is sufficiently long, an assertion interval of the second synchronization signal becomes long. Accordingly, the assertion interval of the third synchronization signal becomes longer correspondingly, and the assertion timing of the third synchronization signal corresponding to the assertion of the second synchronization signal asserted at the time t111 becomes time t112.

As described above using the timing chart of FIG. 6, by operating the third SSG 403 in synchronization with the second SSG 301 in the still image mode, it is possible to keep the display delay small during still image shooting.

Figure 7:
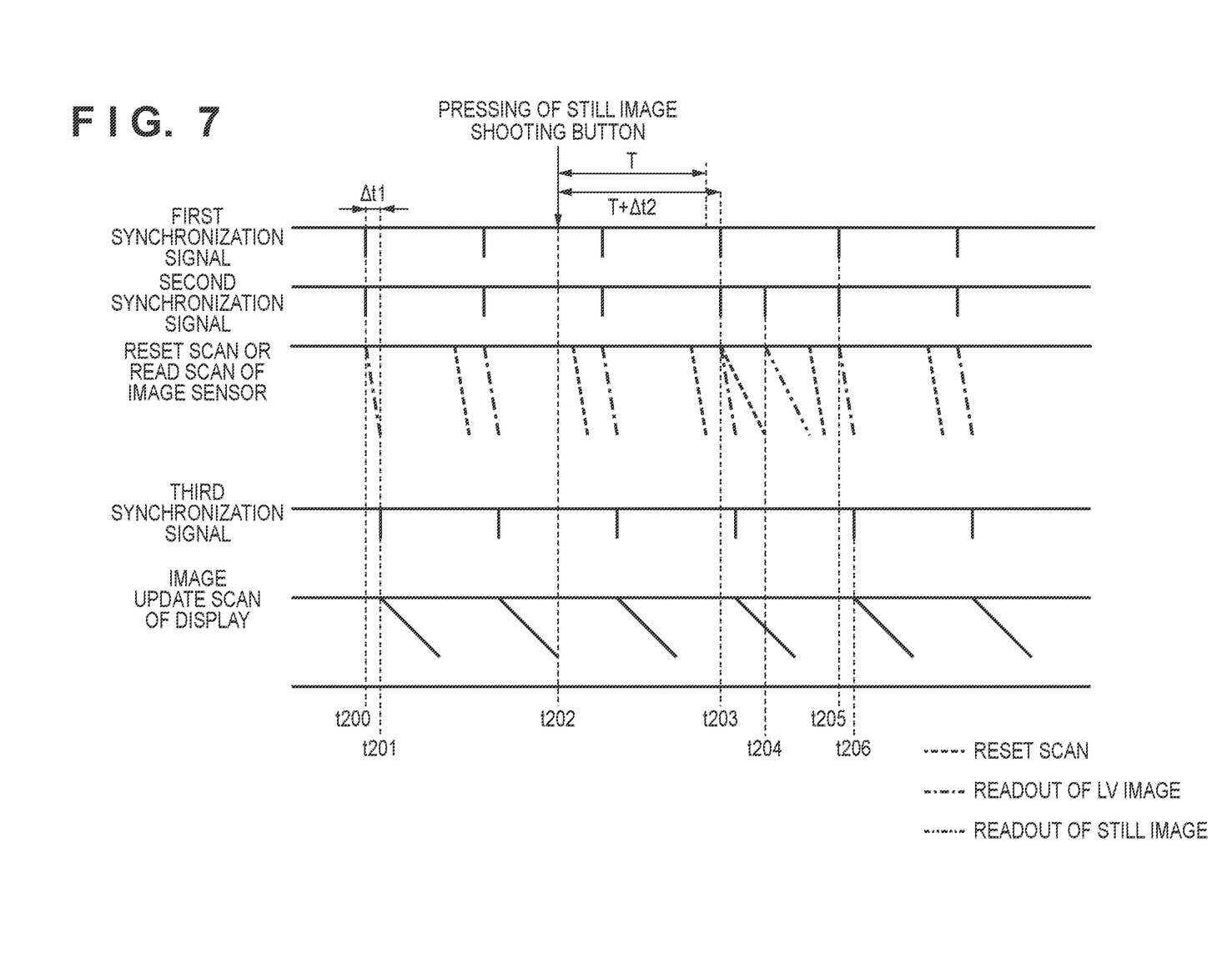
FIG. 7 is a timing chart showing an operation in moving image mode according to the first embodiment.

Next, the operation of the image capturing apparatus 1 when the moving image mode is selected as the shooting mode by the mode switching dial will be described with reference to the timing chart of FIG. 7. In the moving image mode, a moving image signal is used as the image signal for LV image generation. In the moving image mode, the image signal of the moving image itself is recorded, so even if the still image shooting button is pressed, if the shooting cycle of the moving image is changed for shooting a still image, there is a problem that the quality of the moving image to be recorded deteriorates. Therefore, in the moving image mode, it is desirable that the still image is taken so as not to interfere with shooting of the moving image. Note, in FIG. 7, the explanation of the contents already described in the timing chart of FIG. 6 will be omitted.

The CPU 110 controls the timing pulse generation circuit 111 to adjust the assertion timing of the second synchronization signal so that the second synchronization signal is asserted at the same time as the first synchronization signal is asserted at time t200. More specifically, as described above, by calculating the time difference between the assertion timing of the first synchronization signal and the assertion timing of the second synchronization signal and changing the setting of the second SSG 301 so as to cancel the time difference, it is possible to always keep the time difference below a predetermined value. When the second synchronization signal is asserted at time t200, the read scan of the moving image is started.

Since the moving image mode is selected as the shooting mode of the mode switching dial, the synchronization signal selector 401 selects the first synchronization signal. Therefore, the third SSG 403 detects the assertion of the first synchronization signal from the first SSG 300 at time t201, resets the counter values of the vertical counter 404 and the horizontal counter 405, and asserts the synchronization signal. By operating in this way, the third SSG 403 can assert the synchronization signal in synchronization with the first SSG 300.

At time t202, the still image shooting button is pressed, and the image signal of a frame of the moving image shot at this timing on this timing chart is recorded at the same time as being used for the LV display. In this way, when the image signal of the moving image is recorded, the movement looks smooth because the frames of the moving image are shot at regular intervals. Therefore, the timing of shooting frames of a moving image at the time of recording the moving image is more important than the timing of shooting a still image. Therefore, as shown in this timing chart, when shooting a still image in the moving image mode, the charge accumulation and readout of charge are performed at a timing other than the charge accumulation period of the moving image regardless of the release time lag from the timing when the still image shooting button is pressed.

At time t202 when the still image shooting button is pressed, it is determined that the reset scan for the still image starts at the time t203 when the first synchronization signal is asserted immediately after the release time lag T has elapsed. At time t203, the first synchronization signal is asserted, and the second synchronization signal synchronized with it is asserted. In response to the assertion of this second synchronization signal, the readout of the moving image and the charge accumulation of the still image are started.

Further, at time t202 when the still image shooting button is pressed, time t204 at which readout of the still image should be started is also determined according to the accumulation period. Therefore, the CPU 110 sets the timing pulse generation circuit 111 so that the second synchronization signal is asserted (inserted) at time t204, and at time t204, the second synchronization signal is asserted (inserted) according to the setting by the CPU 110 so as to start readout of the still image.

Here, since the synchronization signal selector 401 selects the first synchronization signal from the first SSG 300, the display cycle does not change even if the second synchronization signal is asserted at time t204. Therefore, the update cycle of the LV image can be kept constant. At time t205, the first synchronization signal is asserted again, the second synchronization signal synchronized with it is also asserted, and readout of the moving image starts. At time t206, the third synchronization signal is asserted in synchronization with the first synchronization signal asserted at time t205.

As explained above using the timing chart of FIG. 7, in the moving image mode, the synchronization signal selector 401 selects the first synchronization signal from the first SSG 300. This makes it possible to prevent the LV display from being affected even when a still image is taken between frames of a moving image.

The relationship between the synchronization signals described in the timing chart is an example, and the present invention is not limited to this. For example, a moving image may be taken at a cycle shorter than the cycle of the first synchronization signal. For example, while the first synchronization signal is asserted at a cycle of 30 fps, the shooting cycle of the moving image may be set to a cycle of 120 fps. In that case, the third SSG 403 generates a synchronization signal so as to update the LV display at the same cycle as the shooting cycle of the moving image. Even in that case, the third SSG 403 operates in synchronization with the first synchronization signal selected by the synchronization signal selector 401 at a cycle of 30 fps.

On the contrary, the moving image may be taken at a cycle longer than the cycle of the first synchronization signal. In that case, the third SSG 403 may mask the third synchronization signal so that the synchronization signal output from the third SSG 403 is synchronized with the third synchronization signal that is input multiple times in synchronization with the first synchronization signal to be synchronized less frequently. For example, if the shooting cycle of the moving image is 30 fps and the first synchronization signal is 120 fps, the third SSG 403 masks three out of four third synchronization signals.

As described above, according to the first embodiment, the LV display of the display 114 can be updated at a suitable timing in each of the still image mode and the moving image mode. More specifically, in the still image mode, the display can be updated in a way that reduces the display delay. Further, when a still image is taken in the moving image mode, the display can be updated in a manner that does not impair the smooth movement of a moving image while reducing the display delay.

In the above-mentioned example, the case where control is made according to whether the shooting mode is the still image mode or the moving image mode has been described, but the present invention is not limited thereto. For example, the present invention may be applied to a control depending on whether to give priority to still image shooting if a still image shooting instruction is given when an image signal is periodically read out from the image sensor 107 and the read image signal is used for recording or LV display. Then, when the priority is given to shooting of a still image, as shown in FIG. 6, the second synchronization signal is controlled regardless of the first synchronization signal so that the release time lag is shortened. On the other hand, when priority is not given to shooting of a still image, as shown in FIG. 7, the second synchronization signal is controlled based on the first synchronization signal so that the periodic reading of the image signal does not change. Further, the synchronization signal selector 401 selects the second synchronization signal when the shooting of the still image is prioritized and selects the first synchronization signal when the shooting of the still image is not prioritized. In this way, it is possible to display the image signal read out from the image sensor 107 on display 114 with as little delay as possible.

Second Embodiment

Next, a second embodiment of the present invention will be described.

Figure 8:
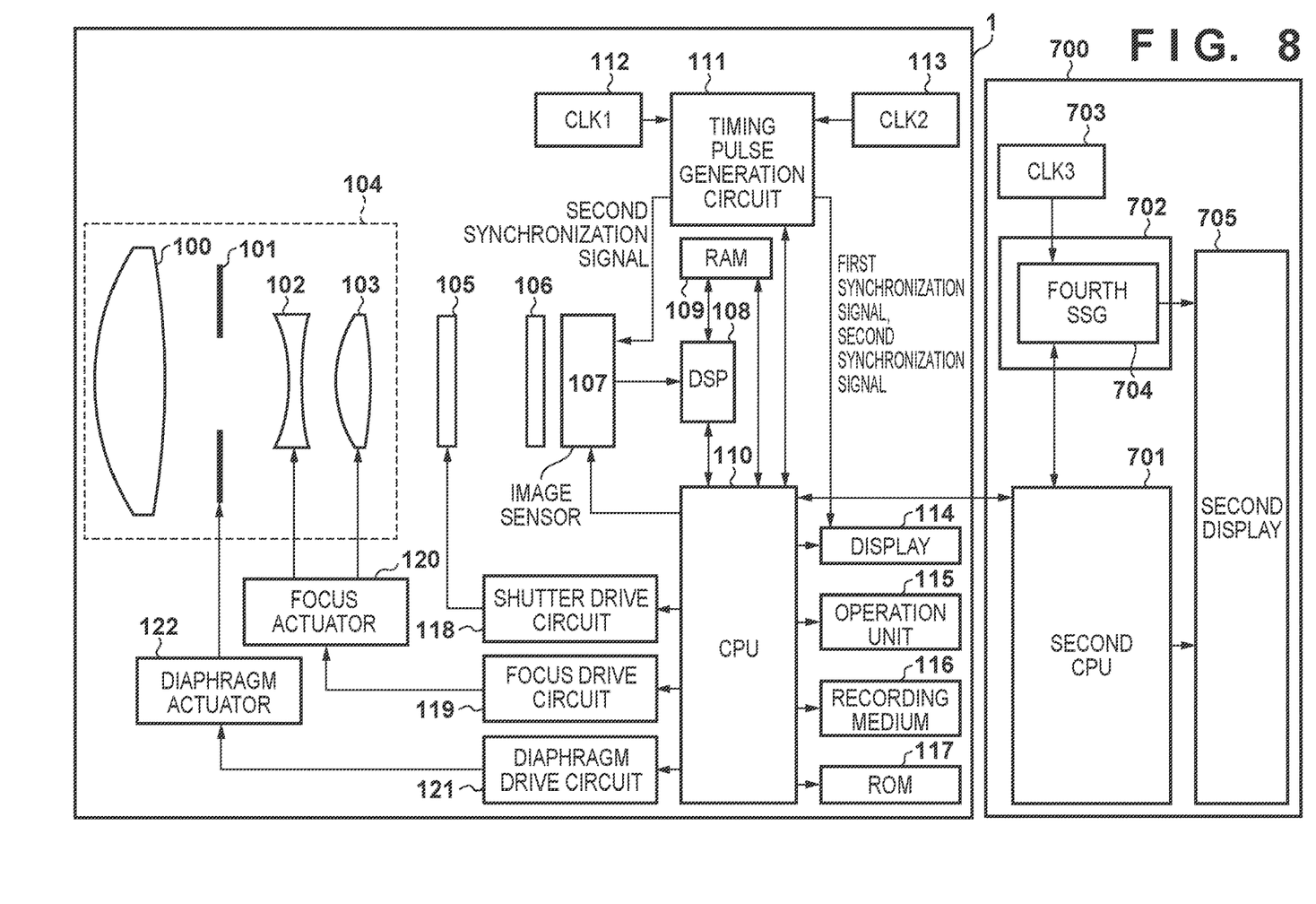
FIG. 8 is a block diagram showing a configuration of an image capturing system according to a second embodiment of the present invention.

FIG. 8 is a block diagram showing the configuration of an image capturing system according to the second embodiment. The same components as those shown in FIG. 1 are designated the same reference numerals and the description thereof will be omitted. In this embodiment, by connecting an external device 700 to the image capturing apparatus 1 having the configuration shown in FIG. 1, the image capturing apparatus 1 and the external device 700 can operate integrally. In the present embodiment, an example will be described in which, of such configurations, an example in which a simpler configuration is realized by not inputting a synchronization signal to the external display device 700 will be shown.

A second CPU 701 is built in the external display device 700, and the second CPU 701 and the CPU 110 are connected and exchange information via communication. The second CPU 701 performs settings on a second timing pulse generation circuit 702 which operates based on a clock signal output from a third clock 703. The second timing pulse generation circuit 702 incorporates a fourth synchronization signal generation circuit 704 (hereinafter, referred to as "fourth SSG"), and the third clock signal CLK3 output from the third clock 703 is input to the fourth SSG 704. Since the fourth SSG 704 does not accept neither of the synchronization signal asserted by the first SSG 300 or the synchronization signal asserted by the second SSG 301, it is not possible to take synchronization between the timing at which the fourth SSG 704 asserts the synchronization signal and the synchronization signal output from the timing pulse generation circuit 111.

A second display 705 displays the image read out from the image sensor 107 according to the synchronization signal asserted by the fourth SSG 704 and the settings by the second CPU 701. In such a configuration, since the timing at which the fourth SSG 704 asserts the synchronization signal has nothing to do with the timing at which the still image shooting button is pressed, the timing at which the image is displayed also has nothing to do with the timing at which the still image shooting start instruction is notified.

At this time, although the timing of updating the image on the external display device 700 is independent of timings of the still image shooting start instruction and moving image shooting, the display time lag in the display 114 may be reduced by performing the operation described in the first embodiment.

As described above, according to the method described in the second embodiment, the number of connection signal lines between the image capturing apparatus 1 and the external display device 700 can be reduced. As a result, it is possible to reduce the display time lag in the viewfinder which is directly viewed by the photographer while displaying an image on the other external monitor or the like with a simple system.

Further, in the present embodiment, for the sake of simplicity, the external device connected to the image capturing apparatus 1 is an external display device, however, the present invention is not limited thereto. For example, it is possible to connect a moving image recording device, an image correction device, and various other devices.

Other Embodiments

The present invention may be applied to a system including a plurality of devices or an apparatus including a single device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-037156, filed on Mar. 4, 2020 which is hereby incorporated by reference herein in its entirety.

What is claimed is:

1. An image capturing apparatus comprising:
a first generation circuit that generates a first synchronization signal with a predetermined cycle;
a second generation circuit that generates a second synchronization signal for controlling timings for driving an image sensor including timings for repeatedly reading out image signals from the image sensor;
a control circuit that controls the second generation circuit in accordance with a driving method of the image sensor;
a selector that selects the first synchronization signal or the second synchronization signal in accordance with the driving method of the image sensor and outputs the selected synchronization signal; and
a display panel that updates and displays image signals which are repeatedly read out from the image sensor at timings delayed from the synchronization signal selected by the selector by a predetermined period,
wherein the predetermined period is the same when the first synchronization signal is selected as when the second synchronization signal is selected.

2. The image capturing apparatus according to claim 1, wherein
the driving method of the image sensor includes a first mode that gives priority to timing of performing still image shooting and a second mode that does not give priority to timing of performing still image shooting,
in a case where the driving method of the image sensor is the first mode, the control circuit controls the second generation circuit so as to generate the second synchronization signal regardless of the first synchronization signal and the selector selects the second synchronization signal, and
in a case where the driving mode of the image sensor is the second mode, the control circuit controls the second generation circuit so as to generate the second synchronization signal in synchronization with the first synchronization signal and the selector selects the first synchronization signal.

3. The image capturing apparatus according to claim 2, wherein
the first mode is a mode to shoot and record a still image,
the second mode is a mode to shoot and record a moving image, and
in the second mode, a still image can be shot while shooting the moving image.

4. The image capturing apparatus according to claim 2, wherein in a case where the driving method of the image sensor is the first mode, the control circuit changes a phase of the second synchronization signal in response to the instruction so that a time lag since an instruction for shooting a still image until the start of shooting a still image becomes short.

5. The image capturing apparatus according to claim 2, wherein in a case where the driving method of the image sensor is the second mode, the control circuit inserts a signal for shooting a still image in a cycle of the second synchronization signal in response to an instruction for shooting a still image.

6. An image capturing system comprising:
an image capturing apparatus comprising:
a first generation circuit that generates a first synchronization signal with a predetermined cycle;
a second generation circuit that generates a second synchronization signal for controlling timings for driving an image sensor including timings for repeatedly reading out image signals from the image sensor;
a control circuit that controls the second generation circuit in accordance with a driving method of the image sensor;
a selector that selects the first synchronization signal or the second synchronization signal in accordance with the driving method of the image sensor and outputs the selected synchronization signal; and
a display panel that updates and displays image signals which are repeatedly read out from the image sensor at timings delayed from the synchronization signal selected by the selector by a predetermined period; and
a processing apparatus, connected to the image capturing apparatus, that includes a processing circuit that processes an image signal output from the image sensor without taking synchronization with the image capturing apparatus,
wherein the predetermined period is the same when the first synchronization signal is selected as when the second synchronization signal is selected.

7. A control method of an image capturing apparatus, the method comprising:
generating a first synchronization signal with a predetermined cycle;
generating a second synchronization signal for controlling timings for driving an image sensor including timings for repeatedly reading out image signals from the image sensor;
controlling generation of the second synchronization signal in accordance with a driving method of the image sensor;
selecting the first synchronization signal or the second synchronization signal in accordance with the driving method of the image sensor and outputting the selected synchronization signal; and
updating and displaying image signals which are repeatedly read out from the image sensor on a display panel at timings delayed from the selected synchronization signal by a predetermined period,
wherein the predetermined period is the same when the first synchronization signal is selected as when the second synchronization signal is selected.

8. A non-transitory computer-readable storage medium, the storage medium storing a program that is executable by a computer, wherein the program includes a program code for causing the computer to perform a control method of an image capturing apparatus, the method comprising:
generating a first synchronization signal with a predetermined cycle;
generating a second synchronization signal for controlling timings for driving an image sensor including timings for repeatedly reading out image signals from the image sensor;
controlling generation of the second synchronization signal in accordance with a driving method of the image sensor;
selecting the first synchronization signal or the second synchronization signal in accordance with the driving method of the image sensor and outputting the selected synchronization signal; and
updating and displaying image signals which are repeatedly read out from the image sensor on a display panel at timings delayed from the selected synchronization signal by a predetermined period,
wherein the predetermined period is the same when the first synchronization signal is selected as when the second synchronization signal is selected.

* * * * *